United States Patent Office 3,335,604
Patented Aug. 15, 1967

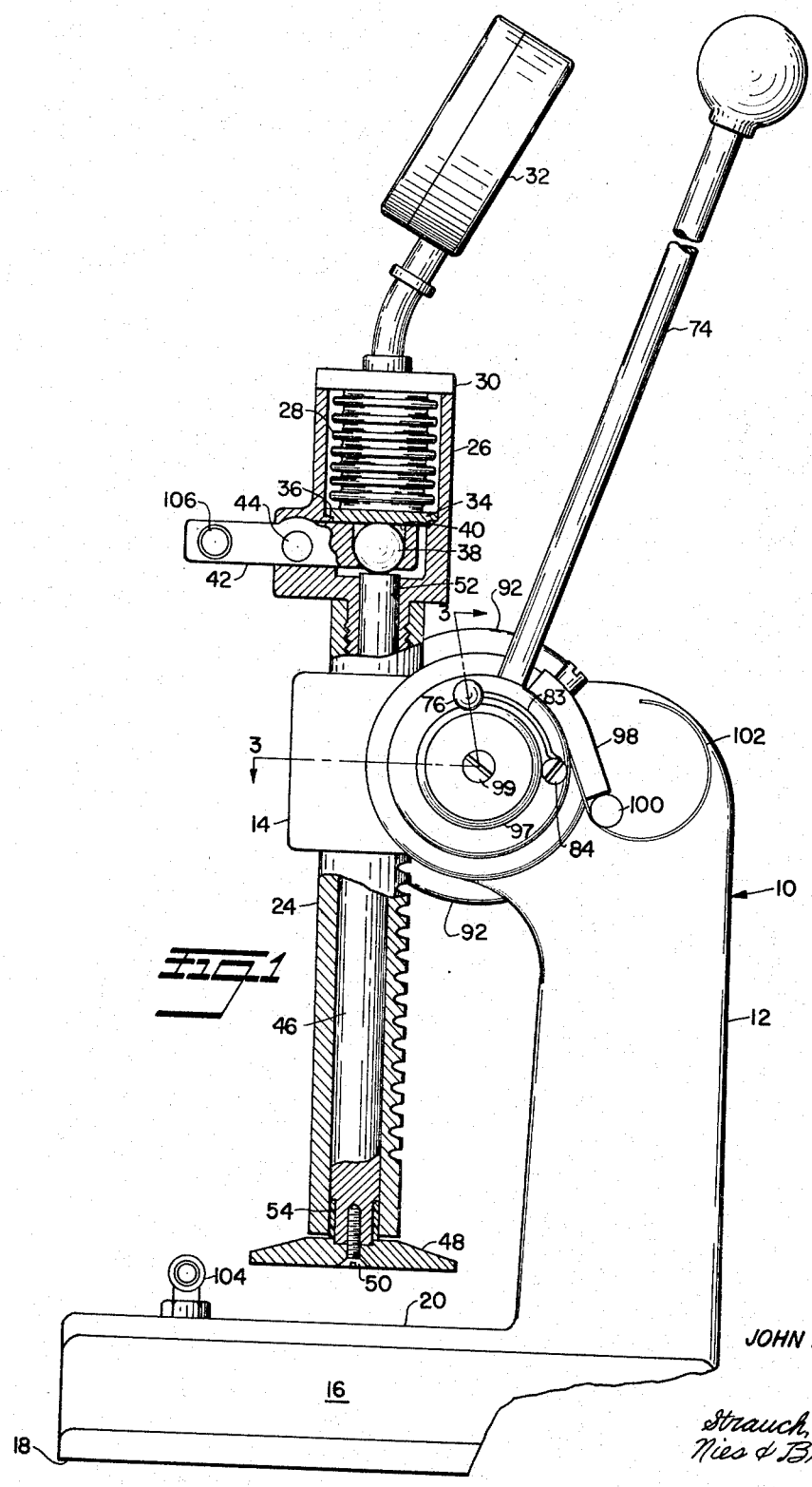

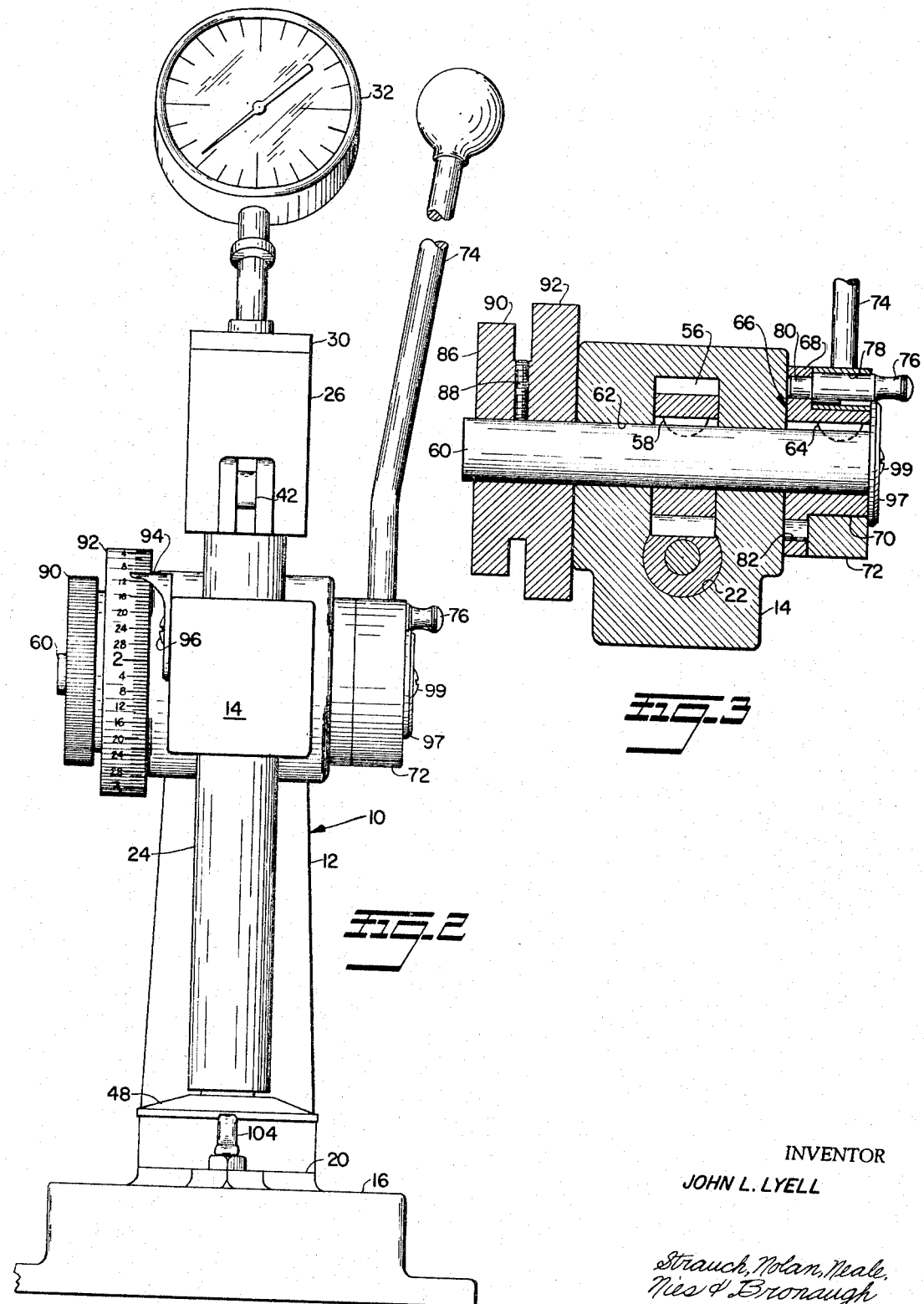

3,335,604
SPRING TESTING APPARATUS
John L. Lyell, 1261 Collier St., Hannibal, Mo. 63401
Filed Oct. 15, 1965, Ser. No. 496,358
4 Claims. (Cl. 73—161)

This invention relates to spring measuring and testing devices and more particularly to such devices for measuring and testing both compression and tension springs.

As is well known, springs such as those used on internal combustion engines are manufactured on a mass production basis and often lack the uniformity of performance necessary to insure their proper function. It is often necessary to replace one of a set of springs, for example, a valve spring. In such a case it is highly desirable that the new spring be selected to match the performance of the remaining springs. Prior devices for testing and comparing spring characteristics have, in general, been characterized by high cost and complexity and usually include a delicate calibration system which is easily disturbed even in normal, careful use. Ordinarily the cost of such devices places them far beyond the resources of a small repair or service facility.

With these consideration in mind, it is the principal purpose and object of the present invention to provide novel spring testing devices which are of simplified rugged construction while retaining the accuracy of the more complex and delicate prior devices.

It is a further object of the present invention to provide improved spring testing devices which can be manufactured and sold initially at low cost and which have an extended service life thus rendering them available to the small machine or repair shop as well as to the larger users.

It is an additional object of the present invention to provide novel spring testing devices which are capable of testing both compression and tension springs within a wide range of sizes and strength.

It is also an object of the present invention to provide improved spring testing devices which are capable of testing both compression and tension springs without rearrangement of any of the parts of the mechanism.

It is an additional object of the present invention to provide improved spring testing devices which are easy to operate and are well within the skill and capabilities of the average mechanic and which provide for direct reading scales for the measurement of the compression or extension of a spring and the force applied to the spring at any deflected position.

Additional objects and advantages of the present invention will become apparent as the description proceeds in connection with the accompanying drawings in which:

FIGURE 1 is a side elevation of spring testing apparatus embodying the present invention with parts broken away to show details of construction;

FIGURE 2 is a front view of the device of FIGURE 1; and

FIGURE 3 is a section taken along line 3—3 of FIGURE 1.

Referring now more particularly to the drawings, the spring testing apparatus of the present invention includes a pedestal indicated generally at 10 having a vertical column 12, at the upper end of which a horizontally projecting boss 14 is formed. The boss 14 overlies the pedestal base 16, the lower flat surface 18 of which is formed for attachment to a work bench, table or the like, and the upper flat surface 20 of which provides a working surface on which the springs to be tested are positioned.

Received with a sliding fit in a through bore 22 in the boss 14, is a vertically displaceable hollow rack 24. At its upper end the rack 24 carries a housing 26 in the upper portion of which is received a sealed bellows 28. The upper end of the housing 26 is closed by a top cover plate 30 which supports a pressure gauge assembly 32. The gauge 32 and the bellows 28 are of standard commercial construction and are connected in conventional manner through the top cover plate 30. The lower end of the bellows 28 is supported by a movable plate 34, normally resting against a shoulder 36 in the housing 26. The plate is adapted to be moved upwardly from the position shown by a ball 38 loosely received in an open bottom recess 40 in the inner end of a lever 42 pivotally mounted as at 44 in the housing 26 and extending outwardly therefrom through a slot in the housing not shown.

A transfer rod 46 extends through the rack 24 to dispose its upper end adjacent the lower surface of the ball 38 and its lower end slightly below the lower end of the rack 24. A pressure pad 48, secured by a screw 50 to the lower end of the transfer rod 46, is adapted to engage the upper end of a spring as will appear. The transfer rod 46 is guided at its upper end in a bore 52 formed in the bottom wall of housing 26. The lower end of the transfer rod is guided by a bushing 54 which also provides sufficient frictional resistance to movement of the rod 46 to prevent it from moving out of the lower end of the rack 24.

As best shown in FIGURE 3, the teeth of the rack 24 are in engagement with a pinion 56 non-rotatably secured by a key 58 to a shaft 60 rotatably received in a through bore 62 in the pedestal boss 14. Keyed as at 64 to one projecting end of the shaft 60 is a hub 66 having a radial flange 68 and a cylindrical mounting portion 70, the latter supporting a collar 72. The collar 72, which is provided with an operating handle 74, is adapted to be selectively locked to the hub 66 by a pin 76 slidably received in a bore 78 in the collar and having a reduced portion 80 normally received in one of a series of openings 82 in the flange 68 of the hub. Preferably the openings 82 are twelve in number spaced at intervals of 30°. The pin 76 is resiliently held in the position shown by a spring 83, one end of which extends through the head of the pin and the opposite end of which is secured by a screw 84 to the outer face of the collar 72.

The opposite end of the shaft 60 projects through an indicator collar 86 held in place by a set screw 88. The collar 86 is provided with a knurled portion 90 to facilitate its rotation and an indicator portion 92 carrying a scale on its outer surface for cooperation with a pointer 94 adjustably mounted by a screw 96 on the side of the pedestal boss 14. At assembly the collar 86 is so adjusted as to provide a direct indication of the distance between the bottom of pressure pad 48 and the support surface 20. The shaft 60 and all of the components carried thereby are held in position by an end cover plate 97 secured by a screw 98 to the end of the shaft 60.

The collar 72 and operating handle 74 are normally held in the position shown in FIGURE 1 to dispose a stop 99 carried by the collar 72 against a stop pin 100 carried by the pedestal. The parts are urged to this position by a laminar spring 102 of conventional construction secured to the collar 72 beneath the stop 99.

In a typical case the apparatus is dimensioned to handle compression springs having a diameter up to 2½ inches and a length up to 5 inches, and will apply a compressive load to the spring from 0 to 300 pounds. The device is also capable of testing and comparing tension springs having a diameter up to 1¼ inches and a maximum length of 12 inches and will apply a tensile force to the springs up to about 300 pounds. It will be understood, however, that the device can be made larger or smaller to accommodate the needs of a particular application.

To ready the device for testing a compression spring, it is necessary only to place the spring between the base surface 20 and the pressure pad 48. If necessary the pressure pad 48 may be raised or lowered as desired by withdrawing the pin 76 and manually positioning the rack 24 at approximately the desired height by rotation of the member 86 then moving the rack upwardly or downwardly slightly to permit the pin to re-engage one of the openings 82. This adjustment does not change the position of the handle. Then with the spring in position beneath the pressure plate 48, the handle 74 is moved in a counterclosewise direction to lower the pressure pad 48 into light contact with the upper end of the spring. The full length of the spring may then be read directly from the dial 92. This capability permits precise comparison of length of all springs making up a set. Springs which do not meet length requirements may be discarded. The proper shims to be added to short springs can be readily calculated.

The load then applied to the spring by rotation of handle 74 is transferred through the pressure pad 48, rod 46, ball 38 and the pressure plate 34 to the bellows 28, thus causing the gauge 32 to register the force applied to the spring at any given deflection. At any position of lever 74, a direct visual indication of the extent of deflection of the spring and the force applied to the spring at that deflection is immediately available.

It will be apparent that a series of springs can readily be tested and compared by restoring the apparatus to its initial position, removing one spring and replacing it with the next spring to be tested.

Springs to be tested in tension are installed with one end in a spring eye 104 carried by the pedestal base and the opposite end hooked through an opening 106 in the outer end of the lever 42. The lever is so dimensioned as to dispose the center of opening 106 and the center of ball 38 at equal distances from the center of the pivot 44. Accordingly, when the spring is placed under tension by operation of the handle 74, the force applied to the spring can be directly read on the gauge 32.

To test a spring in tension, the handle 74 is first rotated in a counterclockwise direction to the extent desired, the spring is then installed at zero tension, the indicator dial 92 is read and the handle 74 is then rotated in a clockwise direction and readings are taken as desired to determine the applied force and the deflection at any desired number of points. It is understood that to accommodate springs of various length, it may be necessary to make a preliminary adjustment of the vertical position of the rack by operation of the pin 76 in the manner described above.

It is to be particularly noted that the apparatus is immediately ready for the testing either of compression or tension springs without removing or adding parts or changing the relative arrangement of any of the parts, and regardless of the type of spring tested, the ratio of length to force may be directly read from the two scales provided, at any deflected point of the springs.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Spring testing apparatus comprising a pedestal having a fixed base adapted to hold one end of a tension or compression spring in fixed position, and a support portion overhanging said base, force applying means movably carried by said support portion for displacing the opposite end of said tension or compression spring to thereby apply a tension or compression load to said spring, a pressure gauge carried by said force applying means and movable therewith, rigid means for applying said tension or compression load directly to said pressure gauge, and a linear scale having a part movable with said force applying means, and a second part carried by said pedestal in fixed position to measure the movement of said force applying means with respect to said fixed base to thereby provide a direct indication of the deflection of said spring.

2. Spring testing apparatus comprising a pedestal having a fixed base adapted to hold one end of a tension or compression spring in fixed position and a support portion overhanging said base, a rack movably carried by said support portion, a pinion carried by said support portion in engagement with said rack, means for moving said pinion to displace said rack, a transfer rod assembly extending freely slidably through said rack for applying a compressive load to the opposite end of a compression spring, a lever pivotally carried by said rack for applying a tensile load to the opposite end of a tension spring, a pressure gauge carried by said rack and movable therewith, and rigid means operatively connecting said transfer rod assembly and said lever directly to said pressure gauge thereby for transferring either said compressive load or said tensile load directly to said pressure gauge, and a scale having one part movable with said rack, and a second part carried by said pedestal to provide a direct indication of the deflection of said spring.

3. Spring testing apparatus comprsing a pedestal having a base adapted to hold one end of a tension or compression spring in fixed position, and a support portion overhanging said base, a rack carried by said support portion for movement in a direction normal to said base, a pinion carried by said support portion in engagement with said rack, means for rotating said pinion to displace said rack in a direction normal to said base, a pressure gauge carried by said rack, said pressure gauge having a pressure sensitive element disposed adjacent one end of said rack, a first force applying assembly extending freely through said rack from the region adjacent said pressure sensitive element to the free end of a compression spring positioned on said base to apply a compressive load to said spring, force transmitting means interposed between the end of said force applying assembly and said pressure sensitive element for transmitting the load on said compression spring to said pressure sensitive element, a second force applying assembly movably carried by said rack for applying a tensile load to the free end of a tensile spring carried by said base, said force transmitting means being interposed between said second force applying assembly and said pressure sensitive member to transmit the tensile load applied by said second forced applying assembly to said pressure sensitive element, and a scale having a part movable with said rack and a part carried by said pedestal to provide a direct indication of the deflection of said tension or compression spring.

4. The spring testing apparatus according to claim 3, together with an operating handle for said pinion, and means for selectively connecting said handle to said pinion in a plurality of selected relatively rotated positions.

References Cited
UNITED STATES PATENTS

| | | | |
|---|---|---|---|
| 1,874,780 | 8/1932 | McGuckin | 73—161 |
| 2,088,372 | 7/1937 | Gogan | 73—161 |
| 2,612,041 | 9/1952 | Good Friend | 73—161 XR |
| 2,746,288 | 5/1956 | Scott | 73—161 XR |
| 3,129,584 | 4/1964 | Canning et al. | 73—141 |

DAVID SCHONBERG, *Primary Examiner.*

LOUIS R. PRINCE, J. NOLTON, *Assistant Examiners.*